(12) United States Patent
Otanez et al.

(10) Patent No.: US 11,685,262 B2
(45) Date of Patent: Jun. 27, 2023

(54) INTELLIGENT MOTOR VEHICLES AND CONTROL LOGIC FOR SPEED HORIZON GENERATION AND TRANSITION FOR ONE-PEDAL DRIVING

(71) Applicant: GM GLOBAL TECHNOLOGY OPERATIONS LLC, Detroit, MI (US)

(72) Inventors: Paul G. Otanez, Franklin, MI (US); Adam J. Heisel, South Lyon, MI (US); Nathaniel S. Michaluk, Howell, MI (US); Yiran Hu, Shelby Township, MI (US); Jacob M. Knueven, Southfield, MI (US); Todd P. Lindemann, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 378 days.

(21) Appl. No.: 17/110,814

(22) Filed: Dec. 3, 2020

(65) Prior Publication Data

US 2022/0176827 A1 Jun. 9, 2022

(51) Int. Cl.
*B60L 15/20* (2006.01)
*B60K 17/00* (2006.01)
(Continued)

(52) U.S. Cl.
CPC ............... *B60L 15/20* (2013.01); *B60K 1/00* (2013.01); *B60K 17/00* (2013.01); *B60K 26/02* (2013.01);
(Continued)

(58) Field of Classification Search
CPC ............... B60L 15/20; B60L 2240/12; B60L 2240/423; B60L 2250/00; B60L 2260/44;
(Continued)

(56) References Cited

U.S. PATENT DOCUMENTS 6,356,838 B1 3/2002 Paul
6,697,730 B2 2/2004 Dickerson
(Continued)

FOREIGN PATENT DOCUMENTS

DE 102014016567 A1 5/2016
EP 2610836 A1 7/2013

*Primary Examiner* — Alan D Hutchinson
(74) *Attorney, Agent, or Firm* — Quinn IP Law (57) ABSTRACT

A method of operating a vehicle includes a vehicle controller receiving a driver acceleration/deceleration command for the vehicle's powertrain and determining a torque request corresponding to the driver's acceleration command. The controller shapes the torque request and determines compensated and uncompensated accelerations from the shaped torque request. The compensated acceleration is based on an estimated road grade and an estimated vehicle mass, whereas the uncompensated acceleration is based on a zero road grade and a nominal vehicle mass. A final speed horizon profile is calculated as: a speed-control speed profile based on the uncompensated acceleration if the vehicle's speed is below a preset low vehicle speed; or a torque-control speed profile based on a blend of the compensated and uncompensated accelerations if the vehicle speed exceeds the preset low vehicle speed. The controller commands the powertrain to output a requested axle torque based on the final speed horizon profile.

20 Claims, 4 Drawing Sheets

(51) Int. Cl.
*B60K 1/00* (2006.01)
*B60K 26/02* (2006.01)

(52) U.S. Cl.
CPC ..... *B60K 2026/025* (2013.01); *B60L 2240/12* (2013.01); *B60L 2240/423* (2013.01); *B60L 2250/00* (2013.01); *B60L 2260/44* (2013.01)

(58) Field of Classification Search
CPC .... B60L 3/12; B60L 2250/26; B60L 2250/16; B60L 2260/26; B60K 1/00; B60K 17/00; B60K 26/02; B60K 2026/025; Y02T 10/72
See application file for complete search history.

(56) References Cited

U.S. PATENT DOCUMENTS

| | | | |
|---|---|---|---|
| 7,266,438 B2 | 9/2007 | Kellum et al. |
| 7,589,643 B2 | 9/2009 | Dagci et al. |
| 7,739,036 B2 | 6/2010 | Grimm et al. |
| 7,840,427 B2 | 11/2010 | O'Sullivan |
| 8,050,855 B2 | 11/2011 | Coy et al. |
| 8,170,739 B2 | 5/2012 | Lee |
| 8,384,532 B2 | 2/2013 | Szczerba et al. |
| 8,428,843 B2 | 4/2013 | Lee et al. |
| 8,605,011 B2 | 12/2013 | Seder et al. |
| 8,612,139 B2 | 12/2013 | Wang et al. |
| 8,633,979 B2 | 1/2014 | Szczerba et al. |
| 8,692,739 B2 | 4/2014 | Mathieu et al. |
| 8,818,708 B2 | 8/2014 | Mathieu et al. |
| 8,849,515 B2 | 9/2014 | Moshchuk et al. |
| 8,996,273 B2 | 3/2015 | Lee et al. |
| 9,014,915 B2 | 4/2015 | Chatterjee et al. |
| 9,099,006 B2 | 8/2015 | Mudalige et al. |
| 9,229,453 B1 | 1/2016 | Lee |
| 9,238,412 B1 | 1/2016 | Kidston et al. |
| 9,267,810 B2 | 2/2016 | Pritchard |
| 9,283,967 B2 | 3/2016 | Lee |
| 9,443,429 B2 | 9/2016 | Mathieu et al. |
| 9,487,212 B1 | 11/2016 | Adam et al. |
| 9,809,130 B2 | 11/2017 | Heisel et al. |
| 9,868,443 B2 | 1/2018 | Zeng et al. |
| 9,931,963 B2 | 4/2018 | Heisel et al. |
| 10,005,363 B1 | 6/2018 | Correia et al. |
| 10,227,021 B2 | 3/2019 | Lor et al. |
| 10,259,341 B2 | 4/2019 | Lor et al. |
| 10,556,587 B2 | 2/2020 | Michaluk |
| 2009/0030885 A1 | 1/2009 | DePasquale et al. |
| 2010/0228415 A1 | 9/2010 | Paul |
| 2011/0059693 A1 | 3/2011 | O'Sullivan |
| 2011/0153127 A1* | 6/2011 | Weslati ................. G01C 21/26 701/1 |
| 2011/0313880 A1 | 12/2011 | Paul et al. |
| 2012/0101713 A1 | 4/2012 | Moshchuk et al. |
| 2012/0239452 A1 | 9/2012 | Trivedi et al. |
| 2013/0032421 A1 | 2/2013 | Bonne et al. |
| 2013/0035821 A1 | 2/2013 | Bonne et al. |
| 2013/0054128 A1 | 2/2013 | Moshchuk et al. |
| 2013/0204676 A1 | 8/2013 | Hindi et al. |
| 2013/0211678 A1* | 8/2013 | Lee ....................... B60W 10/20 701/42 |
| 2013/0219294 A1 | 8/2013 | Goldman-Shenhar et al. |
| 2014/0011522 A1 | 1/2014 | Lin et al. |
| 2015/0077270 A1 | 3/2015 | Rubin et al. |
| 2015/0266469 A1* | 9/2015 | Gibson ................. F02D 41/062 180/65.265 |
| 2015/0353082 A1 | 12/2015 | Lee et al. |
| 2015/0353085 A1 | 12/2015 | Lee |
| 2016/0102986 A1 | 4/2016 | Ma et al. |
| 2016/0231124 A1 | 8/2016 | Nickolaou et al. |
| 2016/0260328 A1 | 9/2016 | Mishra et al. |
| 2016/0320194 A1 | 11/2016 | Liu et al. |
| 2016/0320195 A1 | 11/2016 | Liu et al. |
| 2016/0320198 A1 | 11/2016 | Liu et al. |
| 2016/0321566 A1 | 11/2016 | Liu et al. |
| 2016/0321771 A1 | 11/2016 | Liu et al. |
| 2017/0021830 A1 | 1/2017 | Feldman et al. |
| 2017/0316684 A1 | 11/2017 | Jammoussi et al. |
| 2018/0257660 A1 | 9/2018 | Ibrahim et al. |
| 2018/0364700 A1 | 12/2018 | Liu et al. |
| 2018/0374341 A1 | 12/2018 | Branson et al. |
| 2019/0241075 A1* | 8/2019 | Kurosawa ....... B60W 30/18072 |
| 2019/0369626 A1 | 12/2019 | Lui et al. |
| 2019/0378412 A1 | 12/2019 | Zhu |

\* cited by examiner

FIG. 4

INTELLIGENT MOTOR VEHICLES AND CONTROL LOGIC FOR SPEED HORIZON GENERATION AND TRANSITION FOR ONE-PEDAL DRIVING

INTRODUCTION

The present disclosure relates generally to powertrain control systems for motor vehicles. More specifically, aspects of this disclosure relate to speed horizon generation and transition for one-pedal driving operations of hybrid-electric and full-electric vehicles.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric (collectively "electric-drive") vehicles, on the other hand, utilize alternative power sources to propel the vehicle and, thus, minimize or eliminate reliance on a fossil-fuel based engine for tractive power.

A full electric vehicle (FEV)—colloquially labeled an "electric car"—is a type of electric-drive vehicle configuration that altogether omits the internal combustion engine and attendant peripheral components from the powertrain system, relying on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

As vehicle processing, communication, and sensing capabilities continue to improve, manufacturers will persist in offering new and improved system-automated driving capabilities with the aspiration of eventually producing fully autonomous vehicles competent to operate among heterogeneous vehicle types in both urban and rural scenarios. Such automated and autonomous features may include Adaptive Cruise Control (ACC), Lane Monitoring and Automated Steering ("Auto Steer"), Collision Avoidance Systems (CAS), Intelligent Parking Assist Systems (IPAS), and other Advanced Driver Assistance Systems (ADAS). Original equipment manufacturers (OEM) are moving towards vehicle-to-vehicle (V2V) and vehicle-to-infrastructure (V2I) "talking" cars with higher-level driving automation that employ autonomous control systems to enable vehicle routing with steering, lane changing, scenario planning, etc. Automated route generation systems utilize vehicle tracking and dynamics sensors, map and road condition data, and path prediction algorithms to provide path derivation with automated lane center and lane change forecasting. Computer-assisted rerouting techniques automate constructing alternative travel routes that may be updated based on real-time and virtual vehicle data.

Many automobiles are now equipped with onboard vehicle navigation systems that utilize a global positioning system (GPS) transceiver in cooperation with navigation software and geolocation mapping services to obtain roadway topography, traffic, and speed limit information associated with the vehicle's current and surrounding locations. Autonomous driving and advanced driver assistance systems are often able to adapt the controller-automated driving maneuvers based on roadway information obtained by the in-vehicle navigation system. Ad-hoc-network-based ADAS, for example, may employ GPS and mapping data, in conjunction with multi-hop geocast V2V and V2I data exchanges, to facilitate automated vehicle maneuvering and powertrain control. During assisted and unassisted vehicle operation, the resident navigation system may identify a recommended travel route based on an estimated shortest travel time or estimated shortest travel distance between route origin and route destination for a given trip. This recommended travel route may then be displayed as a map trace or as turn-by-turn driving instructions on a geocoded and annotated map with optional voice commands output by the in-vehicle audio system.

SUMMARY

Presented herein are closed-loop feedback vehicle control systems with attendant control logic for speed horizon estimation, methods for making and methods for operating such systems, and intelligent electric-drive vehicles with speed horizon generation and transition for enhanced one-pedal driving (OPD). By way of example, a method is presented for deriving a speed horizon for vehicle deceleration/acceleration control during an OPD operation that uses predefined driveability targets as described by a vehicle-calibrated acceleration response map and a vehicle-calibrated transient acceleration response map. As used herein, the term "speed horizon" may be typified by an estimated speed behavior of a subject vehicle (e.g., predicted future trajectories to realize a target vehicle speed) over a predefined period of time (the "horizon"). In addition to achieving vehicle driveability targets, speed horizon derivation may be a function of a predefined set of vehicle parameters, such as an effective road load acting on the vehicle from nominal road load forces created using a road load equation with coefficients representing kinetic friction, rolling friction, and aero drag in conjunction with forces acting on vehicle due to mass and gravity. The final derived speed profile may include a sequence of estimated future vehicle trajectories that are used by a vehicle motion controller (VMC) to selectively modulate powertrain actuator commands based on future desired trajectories and measurements.

Speed profile estimation and transition for optimized OPD operation may integrate the following variables to effect improved vehicle propulsion: (1) a driver-desired torque and/or acceleration; (2) a nominal road load based on vehicle parameters; (3) a term based on the effective road load (grade, mass, etc.); and/or (4) an applied braking force, if any. These variables may be converted to one or more vehicle acceleration requests (e.g., using a nominal vehicle mass) and used to compute a speed trajectory profile for governing vehicle propulsion. This information may also be used to create a future speed profile horizon for use by the VMC as part of a closed-loop feedback protocol. During speed horizon estimation, effective road load may be used in such a way that its overall effect is zeroed when switching from a closed-loop speed control protocol to a closed-loop torque control protocol. Speed control may be defined as a region in which a nominal speed trajectory behavior is desired. Comparatively, torque control may be defined as a region in which the vehicle's propulsion torque is defined substantially or entirely by pedal maps.

Attendant benefits for at least some of the disclosed concepts include an intelligent OPD-enabled vehicle with optimized speed horizon derivation that realizes zero vehicle speed at zero pedal travel with consistent tip-in response from zero speed or other desired speeds. Other benefits may include, for example, a VMC that is able to interpret driver demand in both a speed-dominated domain (low vehicle speeds) and a torque-dominated domain (high vehicle speeds) to allow harmonious operation and seamless domain-to-domain transitions. Speed horizon interpretation may also enable consistent pedal response regardless of road load (grade) and vehicle mass while allowing for the integration of OPD operation with driver-commanded brake operations without interrupting vehicle operation. In addition to the foregoing advantages, disclosed features may also help to reduce system complexity and calibration time, improve powertrain response time, and eliminate dead pedal during uphill driving conditions and eliminate pedal surge in downhill driving conditions.

Aspects of this disclosure are directed to vehicle system control logic, closed-loop feedback control techniques, and computer-readable media (CRM) for enhanced speed horizon generation and transition. In an example, a method is presented for operating a motor vehicle, including ICE, HEV and FEV-powertrain configurations. This representative method includes, in any order and in any combination with any of the above and below disclosed options and features: receiving, via a vehicle controller from a driver via a driver input device, an acceleration command for the powertrain of the motor vehicle; determining, via the vehicle controller from a memory-stored acceleration table, a torque and/or acceleration request corresponding to the acceleration command of the driver; shaping the torque/acceleration request based on a memory-stored transient acceleration table; determining compensated and uncompensated acceleration requests from the shaped request, where the compensated acceleration request is based on an estimated road grade and an estimated vehicle mass, and the uncompensated acceleration request is based on a zero road grade and a nominal vehicle mass or the estimated vehicle mass.

Continuing with the discussion of the foregoing example, the method also includes: calculating a final speed horizon profile as: a speed-controlled speed profile based on the uncompensated acceleration if a vehicle speed of the motor vehicle is at a near-zero vehicle speed or other calibratable speed, a blend-controlled speed profile based on a blend of the compensated and uncompensated accelerations if the vehicle speed is above the near-zero vehicle speed and below a predefined threshold vehicle speed, and a torque-controlled speed profile based on the uncompensated acceleration if the vehicle speed is above the predefined threshold vehicle speed; and transmitting, via the vehicle controller to the powertrain, one or more command signals to output a requested axle torque based on the calculated final speed horizon profile.

Additional aspects of this disclosure are directed to closed-loop vehicle control systems and intelligent motor vehicles with enhanced speed horizon generation and transition, e.g., for executing a one-pedal driving operation. As used herein, the terms "vehicle" and "motor vehicle" may be used interchangeably and synonymously to include any relevant vehicle platform, such as passenger vehicles (ICE, REV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, a motor vehicle includes a vehicle body with a passenger compartment, multiple road wheels mounted to the vehicle body, and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to thereby propel the vehicle. A driver input device, which may be in the nature of a lone accelerator pedal, both an accelerator pedal and a brake pedal, a joystick controller, or similarly suitable input device, is operable to receive vehicle control inputs from the vehicle driver.

Continuing with the discussion of the above example, the vehicle also includes an onboard or off-board vehicle controller that is programmed to receive a powertrain acceleration command from the driver via the driver input device and determine, from a memory-stored acceleration table, a torque and/or acceleration request corresponding to the driver's acceleration command. The vehicle controller then shapes the request based on a memory-stored transient acceleration table and concomitantly determines compensated and uncompensated acceleration requests from the shaped request. The compensated acceleration request is based on an estimated road grade and an estimated vehicle mass, whereas the uncompensated acceleration is based on a zero road grade and a nominal vehicle mass or the estimated vehicle mass. The vehicle controller then calculates a final speed horizon profile as: a speed-controlled speed profile based on the uncompensated acceleration if a vehicle speed of the motor vehicle is at a near-zero vehicle speed, a blend-controlled speed profile based on a blend of the compensated and uncompensated accelerations if the vehicle speed is above the near-zero vehicle speed and below a predefined threshold vehicle speed, and a torque-controlled speed profile based on the uncompensated acceleration if the vehicle speed is above the predefined threshold vehicle speed. The controller commands one or more actuators of the vehicle powertrain (e.g., the traction motor(s)) to output a requested axle torque based on the calculated final speed horizon profile.

For any of the disclosed systems, methods, and vehicles, the vehicle controller may receive one or more sensor signals from a speed sensor indicative of a real-time vehicle speed of the motor vehicle. In this instance, the controller selects a vehicle control mode as either a speed control mode or a torque control mode based on the real-time vehicle speed, a position of the driver input device, a rate-of-change of the position of the driver input device, and/or a measured road grade. The command signal(s) transmitted to the powertrain may be based, at least in part, on the selected vehicle control mode. As a further option, calculating the final speed horizon profile as the speed-controlled speed profile may be further based on the real-time vehicle speed. Optionally, the final speed horizon profile may be calculated as the torque-controlled speed profile by eliminating ("blending away") the uncompensated acceleration from the blend if the vehicle speed exceeds a preset high vehicle speed. The final speed horizon profile may be calculated as the speed-controlled speed profile based on a road grade compensation value.

For any of the disclosed systems, methods, and vehicles, the vehicle controller may receive a deceleration command from the driver via the driver input device to reduce the vehicle speed, and concurrently determine a deceleration torque request that corresponds to the driver's deceleration command based on the estimated road grade and estimated vehicle mass. In this instance, calculating the final speed horizon profile as the torque-controlled speed profile may be further based on the deceleration torque request. Optionally, the vehicle controller may receive one or more sensor signals from a brake sensor indicative of a real-time brake torque being applied to one or more of the vehicle's road wheels; the requested axle torque may be modified based on the real-time brake torque.

For any of the disclosed systems, methods, and vehicles, a controller may predict a future vehicle speed trajectory profile for the motor vehicle using a dual-track bicycle model or similarly suitable vehicle body model of the motor vehicle, and modify the requested axle torque to minimize any difference between this future vehicle speed trajectory profile and the final speed horizon profile. As yet a further option, a controller may calculate a nominal road load vehicle force and an effective road load based on the estimated road grade and the estimated vehicle mass. In this instance, calculating the final speed horizon profile as the torque-control speed profile may be further based on the nominal road load vehicle force and the effective road load. The driver input device for receiving driver acceleration and deceleration commands may consist of a singular accelerator pedal; as such, the motor vehicle may lack a brake pedal, and the requested axle torque may be a part of a braking maneuver in a one-pedal driving operation.

For any of the disclosed systems, methods, and vehicles, the vehicle controller may receive: an estimated vehicle mass of the motor vehicle with a current payload from a mass estimation module; and an estimated road grade of a road segment currently being traversed by the motor vehicle from a gradient estimation module. As another option, the above-mentioned acceleration tables may include a controller-retrievable, memory-stored acceleration response map file that maps vehicle speed and vehicle acceleration with powertrain torque output. In this regard, the above-mentioned transient acceleration tables may include a controller-retrievable, memory-stored transient acceleration response map file that defines transient regions between adjacent powertrain acceleration/torque outputs in the file. Calculating a final speed horizon profile may include determining a force horizon based on a torque horizon, a brake request horizon, and a nominal road load horizon repeated for a predefined number (N) steps in a predefined horizon.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Figure 1:
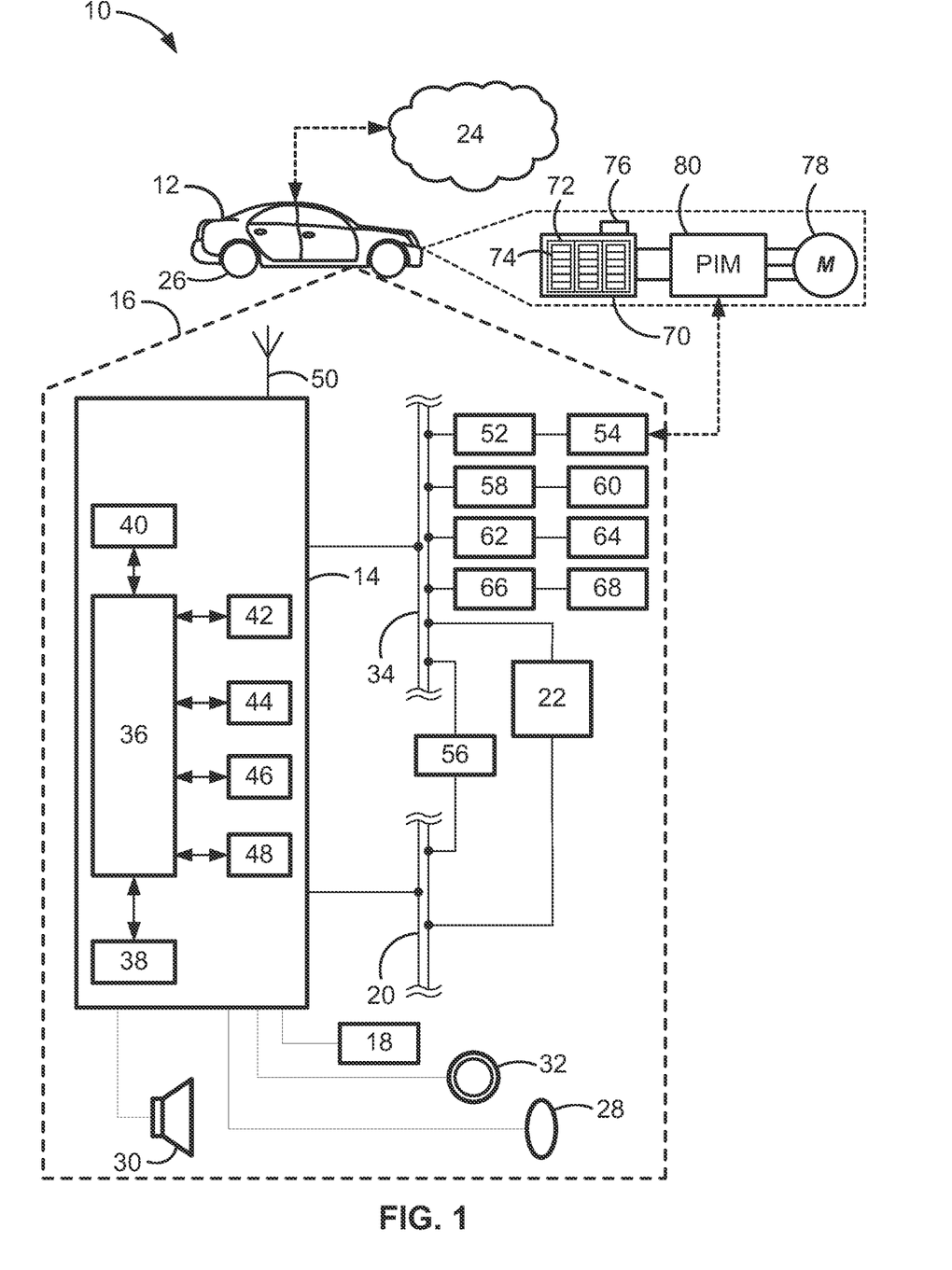
FIG. 1 is a schematic illustration of a representative electric-drive vehicle with a network of in-vehicle controllers, sensing devices, and communication devices for performing speed horizon generation and domain-to-domain transitions for optimized one-pedal driving according to aspects of the disclosed concepts.

Referring now to the drawings, wherein like reference numbers refer to like features throughout the several views, there is shown in FIG. 1 a representative automobile, which is designated generally at 10 and portrayed herein for purposes of discussion as a sedan-style, electric-drive passenger vehicle. The illustrated automobile 10—also referred to herein as "motor vehicle" or "vehicle" for short—is merely an exemplary application with which novel aspects of this disclosure may be practiced. In the same vein, incorporation of the present concepts into an all-electric vehicle powertrain should also be appreciated as a non-limiting implementation of disclosed novel features. As such, it will be understood that aspects and features of this disclosure may be applied to other powertrain architectures, may be implemented for any logically relevant type of vehicle, and may be utilized for both OPD and non-OPD applications alike. Moreover, only select components of the motor vehicles and vehicle control systems are shown and described in additional detail herein. Nevertheless, the vehicles and systems discussed below may include numerous additional and alternative features, and other available peripheral components, for carrying out the various methods and functions of this disclosure.

The representative vehicle 10 of FIG. 1 is originally equipped with a vehicle telecommunication and information ("telematics") unit 14 that wirelessly communicates (e.g., via cell towers, base stations, mobile switching centers, satellite service, etc.) with a remotely located or "off-board" cloud computing host service 24. Some of the other vehicle hardware components 16 shown generally in FIG. 1 include, as non-limiting examples, an electronic video display device 18, a microphone 28, one or more audio speakers 30, and assorted input controls 32 (e.g., buttons, knobs, pedals, switches, touchpads, joysticks, touchscreens, etc.). These hardware components 16 function, in part, as a human/machine interface (HMI) to enable a user to communicate with the telematics unit 14 and other systems and system components within the vehicle 10. Microphone 28 provides a vehicle occupant with means to input verbal or other auditory commands; the vehicle 10 may be equipped with an embedded voice-processing unit utilizing audio filtering, editing, and analysis software modules. Conversely, speaker 30 provides audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switch, internal/external parallel/serial communication bus, a local area network (LAN) interface, a controller area network (CAN), a media-oriented system transfer (MOST), a local interconnection network (LIN) interface, and the like. Other appropriate communication interfaces may include those that conform with ISO, SAE, and IEEE standards and specifications. The network connection interface 34 enables the vehicle hardware 16 to send and receive signals with one another and with various systems and subsystems both within or "resident" to the vehicle body 12 and outside or "remote" from the vehicle body 12. This allows the vehicle 10 to perform various vehicle functions, such as modulating powertrain output, governing operation of the vehicle's transmission, selectively engaging the friction and regenerative brake systems, controlling vehicle steering, regulating charge and discharge of the vehicle's battery modules, and other automated driving functions. For instance, telematics unit 14 receives and transmits signals and data to/from a Powertrain Control Module (PCM) 52, an Advanced Driver Assistance System (ADAS) module 54, a Battery Pack Control Module (BPCM) 56, a Sensor System Interface Module (SSIM) 58, a Brake System Control Module (BSCM) 60, and assorted other vehicle ECUs, such as a transmission control module (TCM), engine control module (ECM), climate control module (CCM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to one or more electronic memory devices 38, each of which may take on the form of a CD-ROM, magnetic disk, IC device, flash memory, semiconductor memory (e.g., various types of RAM or ROM), etc., and a real-time clock (RTC) 42.

Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components or, optionally, may include additional components and functionality as desired for a particular end use. The various communication devices described above may be configured to exchange data as part of a periodic broadcast in a V2V communication system or a vehicle-to-everything (V2X) communication system, e.g., Vehicle-to-Infrastructure (V2I), Vehicle-to-Pedestrian (V2P), and/or Vehicle-to-Device (V2D).

CPU 36 receives sensor data from one or more sensing devices that use, for example, photo detection, radar, laser, ultrasonic, optical, infrared, or other suitable technology for executing an automated driving operation, including short range communications technologies such as DSRC or Ultra-Wide Band (UWB). In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion and analysis hardware and software for processing raw sensor data. The type, placement, number, and interoperability of the distributed array of in-vehicle sensors may be adapted, singly or collectively, to a given vehicle platform for achieving a desired level of autonomous vehicle operation.

To propel the electric-drive vehicle 10, an electrified powertrain is operable to generate and deliver tractive torque to one or more of the vehicle's road wheels 26. The powertrain is generally represented in FIG. 1 by a rechargeable energy storage system (RESS), which may be in the nature of a chassis-mounted traction battery pack 70 that is operatively connected to an electric traction motor 78. The traction battery pack 70 is generally composed of one or more battery modules 72 each having a stack of battery cells 74, such as lithium ion, lithium polymer, or nickel metal hydride battery cells of the pouch, can, or prismatic type. One or more electric machines, such as traction motor/generator (M) units 78, draw electrical power from and, optionally, deliver electrical power to the RESS's battery pack 70. A power inverter module (PIM) 80 electrically connects the battery pack 70 to the motor/generator (M) unit(s) 78 and modulates that transmission of electrical current therebetween.

The battery pack 70 is configured such that module management, cell sensing, and module-to-module or module-to-host communication functionality is integrated directly into each battery module 72 and performed wirelessly via a corresponding wireless-enabled cell monitoring unit (CMU) 76. The CMU 76 may be a microcontroller-based, printed circuit board (PCB)-mounted sensor array with GPS transceiver and RF capability and that is packaged on or in the battery module housing. The battery module cells 74, CMU 76, housing, coolant lines, busbars, etc., collectively define the cell module assembly. The disclosed configuration may forego use of separate hard-wired electronic modules and serial connectors of the type used in a cell sense board based topology.

During operation of the motor vehicle 10, driver and control module inputs engender different vehicle speed and torque commands with concomitant acceleration and deceleration responses. Irrespective of whether the vehicle is an ICE, FEV, or REV-based powertrain, and irrespective of whether the vehicle is equipped with both brake and accelerator pedals or only a single pedal, it may be desirable that the vehicle 10 be enabled to execute a one-pedal drive (OPD) operation. As the name implies, an OPD operation allows a driver to start, accelerate, cruise, tip-in, tip-out, decelerate, and/or stop the vehicle using a single (accelerator) pedal. Presented below are techniques for OPD operation that enables zero vehicle speed (full vehicle stop) at zero pedal (no pedal travel) while delivering robustness to road conditions within a given vehicle speed range. Driveability targets, such as those described by vehicle-calibrated acceleration response charts and related transient acceleration response charts, and vehicle parameters, such as road load coefficients, effective road load, and nominal road load forces, are incorporated into the final speed horizon profile. For at least some implementations, brake force requests may also be comprehended in the formulation. A future trajectory may be used by a vehicle motion controller (VMC) to optimize actuator commands based on future desired trajectories and measurements.

Herein described speed horizon generation and domain-to-domain transition techniques help to deliver a normalized pedal response that is robust to real-time road load and vehicle mass while offering zero and near-zero vehicle speed OPD control. Disclosed speed horizon techniques may also help to minimize or eliminate "dead pedal" during uphill driving conditions and minimize or eliminate "pedal surge" in downhill driving conditions. A dead pedal scenario includes a tip-in driving maneuver with little or no powertrain response during the initial translation of the accelerator pedal. Conversely, a pedal surge scenario includes a tip-in driving maneuver with a disproportionate powertrain response for the initial translation of the accelerator pedal. Speed horizon domain-to-domain transition techniques help to provide consistent behavior between a normalized pedal response at near-zero vehicle speeds and a torque-based pedal response when the vehicle is traveling at higher vehicle speeds (e.g., above 10 kilometers per hour (kph) or another calibratable setpoint). Other attendant benefits may include delivering a repeatable pedal response for each given road grade, and providing more consistent vehicle behavior that does not vary based on the progress of an off-pedal grade learn. In addition, reduced calibration times may be realized through the direct inclusion of acceleration and transient acceleration response map drivability metrics that minimize the need for additional drivability calibrations around speed profile generation.

As will be explained in further detail below during the discussion of FIG. 2, speed horizon generation includes creating a speed profile that is consistent with a driver's torque request, e.g., to achieve one-pedal driving objectives. Driver accelerator pedal input is first interpreted as a corresponding torque or acceleration request based on a callup table with an acceleration response map. The table-derived torque request is then "shaped" using a callup table with a related transient acceleration response map that defines transient acceleration/torque between points in the acceleration response map table. The shaped torque request is then interpreted into two versions of the acceleration request. A first version of the acceleration request may be calculated based on a current estimated road grade and a current estimated vehicle mass. A second version may be calculated based on a zero (0) road grade and a nominal vehicle mass.

A final speed profile may be calculated in any one of three ways depending on the vehicle's real-time speed: (1) at near-zero vehicle speeds (e.g., about 1-3 kph), the final speed profile controls to speed based on a non-compensated acceleration response (i.e., the speed profile is not affected by road load or grade); (2) at low vehicle speeds (e.g., about 3-10 kph), the final speed profile controls to speed based on a blend of compensated and non-compensated acceleration responses; and (3) at higher vehicle speeds (e.g., above about 10 kph), the final speed profile controls to torque target (e.g., without compensating for road load, grade, mass, etc.). In other words, at low vehicle speeds, the speed profile is based on the second version of acceleration request such that the closed-loop speed control compensates for road grade and vehicle mass variations so that driver pedal response is consistent to vehicle response on flat ground with nominal vehicle mass. At higher vehicle speeds, the speed profile blends away from the second version towards the first version; the speed profile is then based on only the first version of acceleration request at or above a torque transition point. Once fully transition to the first version, the closed-loop vehicle speed control may be equivalent to torque control; when control switches from speed control to torque control (and vice versa), undesirable jerk is not detectable by occupants of the vehicle.

The final speed horizon profile may also be adapted to compensate for driver-commanded vehicle deceleration, such as that input by a brake pedal. A driver-input deceleration command may be interpreted as a corresponding driver brake torque request, which is then interpreted as a desired deceleration request. This desired deceleration request may then be merged with the desired acceleration request to compute a final speed horizon profile consistent with both the accelerator and brake pedals. As a further option, the actual applied brake torque at each wheel may be provided to the VMC so that the closed-loop speed control may regulate activation of one or more propulsion actuators in addition to the friction brakes controlled by a brake controller to achieve desired speed tracking. The VMC may use a dual-track bicycle model of the motor vehicle to predict future vehicle speed trajectories (horizons). Actual applied friction brake torque at each wheel may be provided to the model so that the prediction "understands" the effect of the friction brakes on the overall vehicle speed. Propulsion axle torque may then be optimized to minimize the difference between these predicted future vehicle speed trajectories and the desired speed profile.

Presented herein are methodologies that convert driver acceleration and deceleration commands to vehicle drivability targets as described by related acceleration and transient acceleration response maps metrics to a resultant desired vehicle force. Also presented are methodologies that define nominal road load vehicle forces and effective road load forces that are calculated from measured and/or estimated road grade and vehicle mass. Aspects of this disclosure include calculating nominal vehicle speed trajectories (no grade with nominal mass) and effective vehicle speed trajectories (includes estimated grade and mass) and computing a combined trajectory as a function of vehicle speed and grade. Disclosed techniques may use the effective road load force as a function of vehicle speed, grade, etc., to transition out of operating conditions where robustness to grade and mass are needed. Disclosed techniques may use the above in conjunction with a predefined set of vehicle parameters to compute a desired vehicle speed that may be initialized at a measured vehicle speed. Disclosed techniques may predict future vehicle speed trajectories for use by a vehicle motion controller to optimize actuator commands based on vehicle dynamics measurements and future desired commands.

Figure 2:
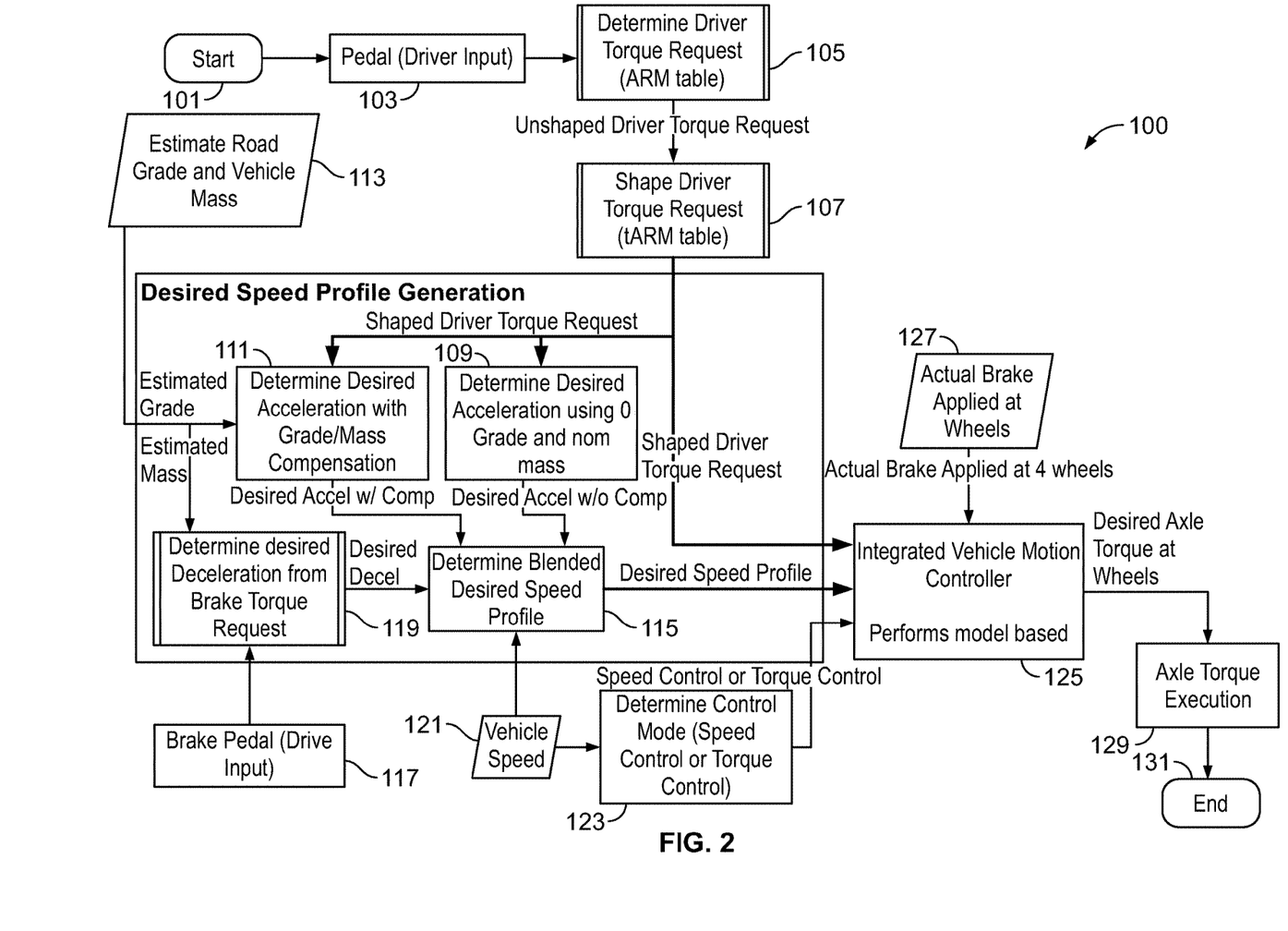
FIG. 2 is a flowchart illustrating a representative speed horizon estimation and transition control protocol, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 2, an improved method or control strategy for performing speed horizon estimation and transition for operating a motor vehicle, such as vehicle 10 of FIG. 1, to perform a desired vehicle maneuver, such as a one-pedal driving operation, is generally described at 100 in accordance with aspects of the present disclosure. Some or all of the operations illustrated in FIG. 2, and described in further detail below, may be representative of an algorithm that corresponds to processor-executable instructions that are stored, for example, in main or auxiliary or remote memory (e.g., memory device 38), and executed, for example, by an electronic controller, processing unit, logic circuit, or other module or device or network of modules/devices (e.g., CPU 36), to perform any or all of the above and below described functions associated with the disclosed concepts. It should be recognized that the order of execution of the illustrated operation blocks may be changed, additional operation blocks may be added, and some of the described operations may be modified, combined, or eliminated.

Method 100 of FIG. 2 begins at terminal block 101 with memory-stored, processor-executable instructions for a programmable controller or control module or similarly suitable processor to call up an initialization procedure for a vehicle powertrain control protocol. This routine may be executed in real-time, continuously, systematically, sporadically and/or at regular intervals, for example, each 10 or 100 milliseconds during normal and ongoing operation of the motor vehicle 10. As yet another option, terminal block 101 may initialize responsive to a user command prompt or a broadcast prompt signal received from an "off-board" centralized host system (e.g., cloud computing service 24 of FIG. 1). Upon completion of the control operations presented in FIG. 2, the method 100 may advance to terminal block 131 and temporarily terminate or, optionally, may loop back to terminal block 101 and run in a continuous loop.

Advancing to process block 103, the method 100 receives a driver-requested speed increase (or decrease) via an in-vehicle driver input device. In accord with the illustrated example, the driver depresses an accelerator pedal to input an acceleration command for the powertrain of the motor vehicle. Upon receipt of this command, subroutine process block 105 of FIG. 2 provides executable instructions to determine, from a vehicle-calibrated acceleration table, a driver torque request that corresponds to the acceleration command input by the driver. This acceleration table may include a memory-stored, controller-accessible acceleration response map file that maps a succession of vehicle speeds and vehicle acceleration values with a corresponding succession of powertrain torque outputs. Raw pedal travel data indicative of a desired acceleration is employed to "look up" a driver torque request in the map file as a function of a measured vehicle speed and a pedal position of the accelerator pedal received from a pedal sensor.

This "unshaped" driver torque request is passed from subroutine process block 105 to subroutine process block 107 of FIG. 2, where it is "shaped" using a vehicle-calibrated transient acceleration table. The transient acceleration table may include a memory-stored, controller-accessible transient acceleration response map file. The transient map file may be a lookup table that defines the powertrain torque in transient regions between adjacent powertrain torque output values in the acceleration map file. By way of non-limiting example, the transient map file may identify a respective ramp rate (e.g., change of acceleration or torque per loop) between each pair of neighboring points in the acceleration map file as a function of vehicle speed and torque change, i.e., the difference between a target torque and a current torque. The driver torque request is shaped by incorporating these accel/torque ramp rate responses in order to add curvature to the torque request profile.

Method 100 proceeds to process blocks 109 and 111 to determine a driver desired acceleration profile that corresponds to the shaped driver torque request output from subroutine process block 107. Process block 109, for example, calculates an "uncompensated" acceleration request profile from the shaped torque request profile based on a zero (0) road grade and a nominal ("nom") vehicle mass or an estimated vehicle mass. Comparatively, process block 111 calculates a "compensated" acceleration request profile from the shaped torque request based on an estimated road grade and the nom or estimated vehicle mass (depending upon which is used for the uncompensated calculation). Using the principles of Newtonian mechanics, the acceleration profile is computed with a force variable F as the mathematical sum of the driver-desired shaped torque, applied brake torque, road grade force, and road load force (ro+r1*v+r2*v^2, where v is the measured vehicle speed). In addition, a mass variable m is either a preset nominal vehicle mass or an estimated/measured (real-time) vehicle mass. For process block 109, in which actual road grade is not considered, the road grade force input is set to zero.

To complete the computations in process block 111, a mass estimation module or suitable mass sensing device outputs an estimated vehicle mass of the subject vehicle with its current payload, as indicated at data process block 113. Data process block 113 may also include a gradient estimation module or suitable gradient sensing device transmitting an estimated road grade of a road segment currently being traversed by the subject vehicle. In this regard, a real-time road grade may be calculated using measurements from an in-vehicle sensor device, such as a triaxial accelerometer, or may be retrieved using real-time geolocation data, such as navigation system map information based on geodetic coordinates received from a Global Positioning System (GPS). Real-time vehicle mass, on the other hand, may be calculated using measurements from a combination of in-vehicle dynamics sensors, such as wheel speed sensors, accelerometers, etc., or predicted using model-based estimators, such as a Kalman Filter (KF), extended KF, sigma point filters, etc., or using machine learning techniques.

Continuing with the discussion of the desired acceleration profile, method 100 of FIG. 2 advances to process block 115 and determines a desired speed profile that is based on the desired acceleration without compensation output from process block 109 and the desired acceleration with compensation output from process block 111. For at least some applications, process block 115 includes calculating a final speed horizon profile as follows: (1) if the current vehicle speed of the subject vehicle is at a near-zero vehicle speed (e.g., about 1-3 kph), the final speed horizon profile is set to a speed-controlled speed profile that may be calculated based predominantly or solely on the uncompensated acceleration; (2) if the vehicle speed is above the near-zero vehicle speed and below a predefined threshold vehicle speed (e.g., about 3-10 khp), the final speed horizon profile is set to a blend-controlled speed profile that may be calculated blending the compensated and uncompensated accelerations; (3) if the vehicle speed is above the predefined threshold vehicle speed (e.g., above about 10 kph), the final speed horizon profile is set to a torque-controlled speed profile that may be calculated based predominantly or solely on the compensated acceleration.

Calculating the final speed horizon profile may include performing a force blend (effective/nominal) technique to determine an effective force horizon or a nominal force horizon. Calculating a force horizon (effective (i)) may be based on a torque horizon, a nominal road load horizon, a brake request horizon, and an effect of road grade horizon. In contrast, calculating a force horizon (nominal (i)) may be based on a torque horizon, a nominal road load horizon, and a brake request horizon; road grade effect is not included in the nominal calculations. These calculations may be repeated for the N steps in the horizon: the output of each calculation is integrated to create the next horizon step in the speed profile. Speed horizon profile calculations are described in further detail below in the discussions of FIGS. 3 and 4.

At process block 117, the method 100 receives a driver-requested speed decrease via an in-vehicle driver input device. In accord with the illustrated example, the driver depresses a brake pedal to input a deceleration command for the powertrain of the motor vehicle to reduce the current speed of the subject vehicle to a desired target speed. Upon receipt of this command, subroutine process block 119 of FIG. 2 provides processor-executable instructions to determine, from a vehicle-calibrated acceleration table, a desired deceleration value and a driver brake torque request that corresponds to the deceleration command input by the driver. This deceleration torque request may be based, at least in part, on the estimated road grade and the estimated vehicle mass output from data process block 113. Similar to the driver's acceleration torque request determined at subroutine process block 105, the driver's desired deceleration torque request may be computed using the callup tables with the related acceleration and transient acceleration response maps; in general, these callup tables provide torque values that would bring the vehicle to a stop when the pedal position is zero. The driver's desired deceleration and corresponding brake torque request may be transmitted to process block 115 for calculating the final speed horizon profile as the torque-controlled speed profile.

To complete the computations in process block 115, a vehicle speed sensor outputs one or more sensor signals indicative of a real-time speed of the subject vehicle at data process block 121. In addition to using real-time vehicle speed data to determine which of the available speed profiles to use as the final speed horizon profile, method 100 may also select a vehicle control mode based on the real-time vehicle speed, as indicated at process block 123. According to the illustrated example, the control mode may be set as either a speed control mode or a torque control mode. For speed control mode, the transient acceleration response map files are interpreted as an acceleration request; brake pedal apply is interpreted as a deceleration request and considered in the speed profile. For torque control mode, the acceleration and transient acceleration response map-based torque request is provided by the VMC. Mode selection may be based on real-time vehicle speed, a position of the driver input device (e.g., pedal position of accelerator/brake pedal), a rate-of-change of the position of the driver input device, and/or a measured road grade.

With continuing reference to FIG. 2, an integrated vehicle motion controller performs a model-based predictive control analysis to determine a desired axle torque to achieve the driver's desired acceleration command (block 103) and/or deceleration command (block 117). To perform this model predictive control (MPC) technique, the integrated VMC aggregates and analyzes the shaped driver torque request output from subroutine process block 107, the desired speed profile output from process block 115, the vehicle control mode output from process block 123, and an actual, real-time brake torque applied to the subject vehicle's road wheels that is output via a brake torque sensor at data process block 127. The VMC may store a model of the vehicle, such as a dual-track bicycle model, in which the torque commands are the control variables. The model may be derived using first principles or experimentally determined, or a combination of both. Optimization techniques may be used to calculate the torque commands that minimize a tracking error (i.e., difference between the calculated speed profile and the measured vehicle speed) in the time horizon of interest (e.g., N seconds into the future). In torque control, the error may be considered between the torque request and the commanded controller torque.

The desired axle torque at the road wheels of the vehicle is output from process block 125 and transmitted to the powertrain (e.g., from CPU 36 to PCM 52 and PIM 80) for axle torque execution at process block 129. For at least some implementations, a future vehicle speed trajectory profile for the subject vehicle may be predicted using a dual-track bicycle model of the vehicle. The requested axle torque may be modified to minimize any difference between the future vehicle speed trajectory profile and the final speed horizon profile. Upon execution of the desired axle torque, the method 100 may advance to terminal block 131 and terminate.

Figure 3:
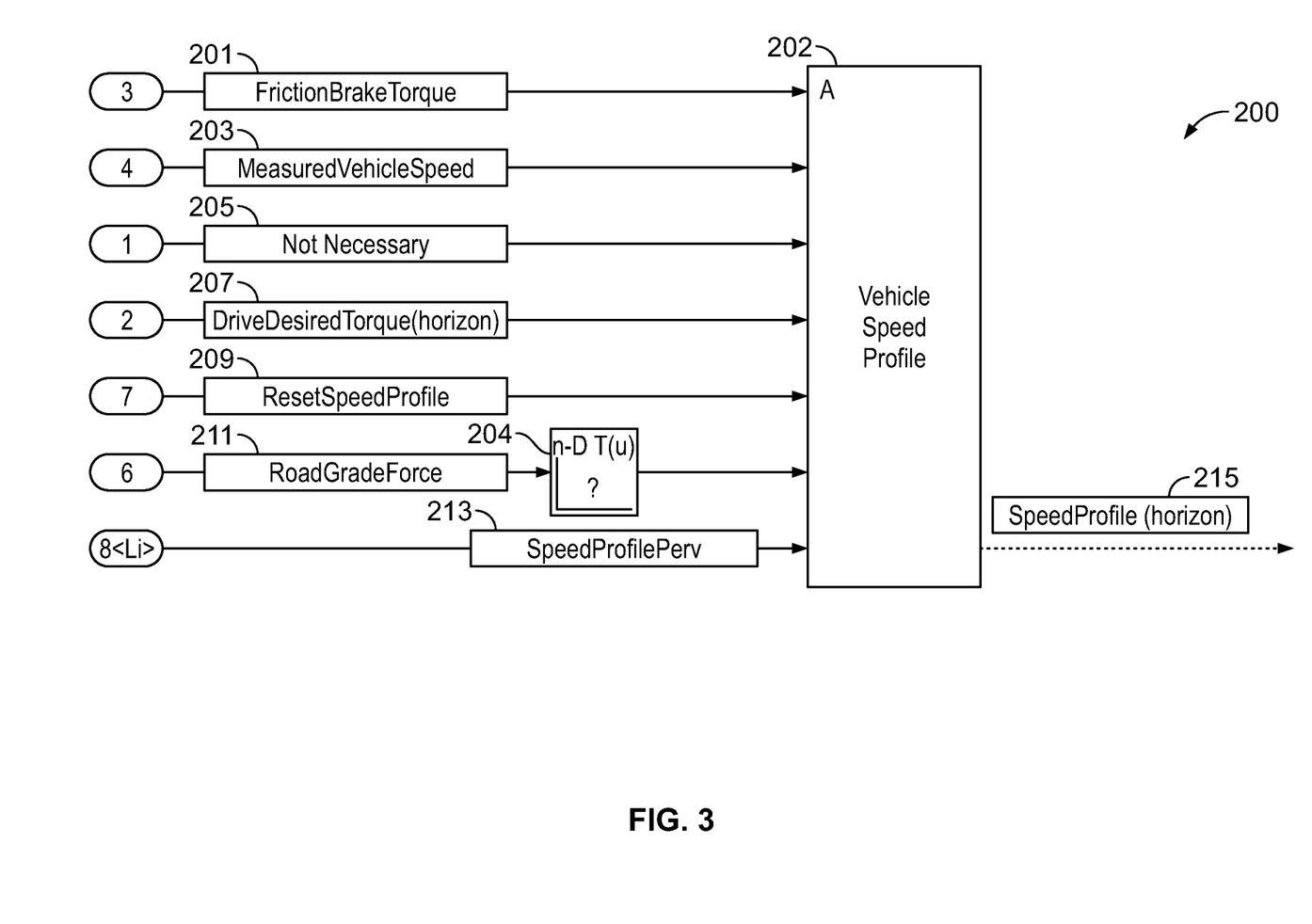
FIG. 3 is a flowchart illustrating a representative speed profile blend control protocol for speed horizon estimation, which may correspond to memory-stored instructions that are executable by a resident or remote controller, control-logic circuit, programmable control unit, or other integrated circuit (IC) device or network of devices in accord with aspects of the disclosed concepts.

FIG. 3 schematically illustrates a first option for speed profile blending method 200 that may be used with the speed horizon estimation and transition control protocol of FIG. 2. In this example, there is a single processing module—Vehicle Speed Profile Block (A) 202—that aggregates and analyzes a set of closed-loop feedback inputs and, from these inputs, outputs a speed profile. There are seven inputs in the illustrated example of FIG. 3: a friction brake torque 201, a measured vehicle speed 203, an optional (but not necessary) control input 205, a driver-desired torque (horizon) 207, a reset speed profile 209, measured road grade forces (mgsin(theta)) 211, and a previous speed profile 213. Process block 204 executes a lookup function "n-D T(u)" whereat the road grade force is multiplied by a constant ranging from [x1,x2] (e.g., [0,1]), which is selected as a function of vehicle speed and measured grade. Generally, the constant is set to zero when the vehicle speed is zero. From these inputs, the Vehicle Speed Profile Block (A) 202 calculates a speed horizon profile 215. In particular, Block (A) 202 uses the above-enumerated seven inputs, as well as a set of road load forces (r0+r1*v+r2*v^2) (e.g., as input 205), to calculate a desired acceleration and, through integration, calculates the speed horizon profile 215. The measured road grade force(s) may be measured/calculated from onboard sensors, such as accelerometers, GPS, etc. This signal, as well as the measured vehicle speed, may be filtered to reject specific frequency content.

Figure 4:
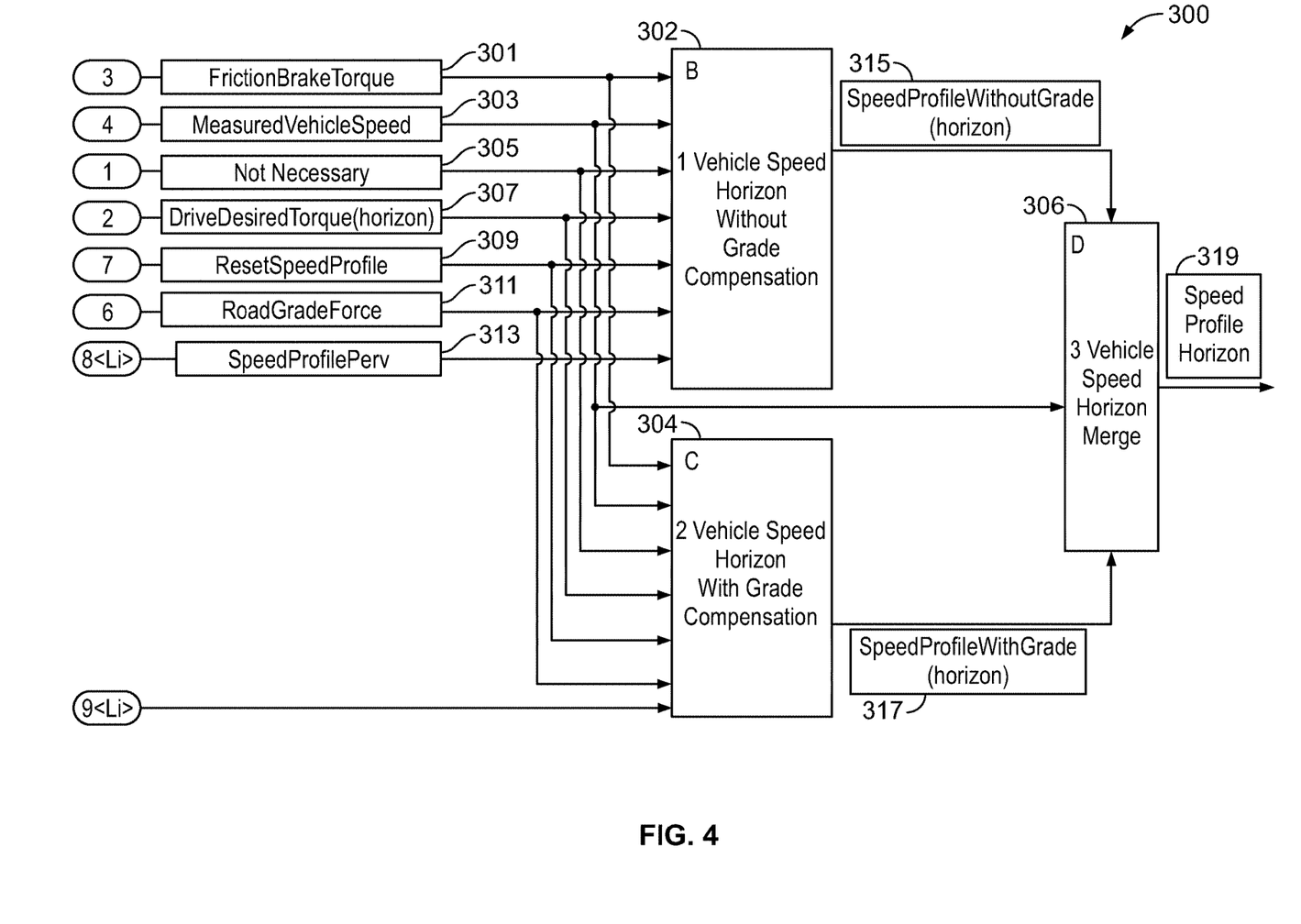
FIG. 4 is a flowchart illustrating another representative speed profile blend control protocol for speed horizon estimation, which may correspond to memory-stored instructions that are executable by a resident or remote controller, control-logic circuit, programmable control unit, or other integrated circuit (IC) device or network of devices in accord with aspects of the disclosed concepts.

FIG. 4 schematically illustrates a second option for speed profile blending method 300 that may be used with the speed horizon estimation and transition control protocol of FIG. 2. In this example, there is a three processing modules—Vehicle Speed Horizon (Without Grade Compensation) Block (B) 302, Vehicle Speed Horizon (With Grade Compensation) Block (C) 304, and a Vehicle Speed Horizon Merge Block (D) 306—that aggregates and analyzes a set of closed-loop feedback inputs and, from these inputs, outputs a speed profile. Similar to FIG. 3, there are seven inputs in the illustrated example of FIG. 4: a friction brake torque 301, a measured vehicle speed 303, an optional (but not necessary) control input 305, a driver-desired torque (horizon) 307, a reset speed profile 309, measured road grade forces (mgsin(theta)) 311, and a previous speed profile 313. From these inputs, the first Vehicle Speed Horizon Block (B) 302 outputs a non-compensated speed horizon profile (without grade) 315, and the second Vehicle Speed Horizon Block (C) 304 outputs a compensated speed horizon profile (with grade) 317. Vehicle Speed Horizon Merge Block (D) 306 merges the compensated and non-compensated speed horizon profiles 317, 315 and outputs speed horizon profile 319.

In FIG. 4, the Vehicle Speed Horizon Block (B) 302 uses the same inputs as mentioned above with reference to Vehicle Speed Profile Block (A) 202 of FIG. 3, except the road grade force 311 is multiplied by zero (0) and, thus, is not part of the calculation of the non-compensated speed horizon profile 315. By comparison, Vehicle Speed Horizon Block (C) 304 of FIG. 4 uses the same inputs as Vehicle Speed Profile Block (A) 202; however, the road grade force 311 is entered directly without being multiplied by a constant. Vehicle Speed Horizon Merge Block (D) 306 combines the profiles from blocks (B) and (C) 302, 304 in the following form:

FinalSpeedProfile=(1−c)*SpeedProfileWithoutGrade+ c*SpeedProfileWithGrade where the merging constant c is a function of measured vehicle speed and measured road grade (e.g., c=0 the vehicle speed is 0 kph0.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, solid-state memory, a hard drive, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a motor vehicle, the motor vehicle including a powertrain operable to propel the motor vehicle and a driver input device operable to receive vehicle control inputs from a driver of the motor vehicle, the method comprising:

receiving, via a vehicle controller from the driver via the driver input device, an acceleration command for the powertrain of the motor vehicle while traversing a road segment;

determining, via the vehicle controller from an acceleration table, an acceleration or torque request corresponding to the acceleration command of the driver;

shaping the acceleration or torque request based on a transient acceleration table;

determining compensated and uncompensated accelerations from the shaped request, the compensated acceleration based on an estimated road grade of the road segment and an estimated vehicle mass of the motor vehicle, and the uncompensated acceleration based on a zero road grade and a nominal vehicle mass or the estimated vehicle mass;

calculating a final speed horizon profile as: a speed-controlled speed profile based on the uncompensated acceleration when a vehicle speed of the motor vehicle is at a calibratable or near-zero vehicle speed, a blend-controlled speed profile based on a blend of the compensated and uncompensated accelerations when the vehicle speed is above the near-zero vehicle speed and below a predefined threshold vehicle speed, and a torque-controlled speed profile based on the uncompensated acceleration when the vehicle speed is above the predefined threshold vehicle speed; and transmitting, via the vehicle controller to the powertrain, a command signal to output a requested axle torque based on the calculated final speed horizon profile.

2. The method of claim 1, further comprising:

receiving, via the vehicle controller from a speed sensor, a sensor signal indicative of a real-time vehicle speed of the motor vehicle; and selecting a vehicle control mode as a speed control mode or a torque control mode based on the real-time vehicle speed, a position of the driver input device, a rate-of-change of the position of the driver input device, and/or a measured or estimated road grade, wherein the command signal transmitted to the powertrain is further based on the selected vehicle control mode.

3. The method of claim 2, wherein calculating the final speed horizon profile as the speed-controlled speed profile is further based on the real-time vehicle speed.

4. The method of claim 1, further comprising:

receiving, via the vehicle controller from the driver via the driver input device, a deceleration command to reduce the vehicle speed of the motor vehicle; and determining a deceleration torque or deceleration request corresponding to the deceleration command of the driver based on the estimated road grade and the estimated vehicle mass.

5. The method of claim 4, wherein calculating the final speed horizon profile as the torque-controlled speed profile is further based on the deceleration torque or deceleration request corresponding to the deceleration command of the driver.

6. The method of claim 1, further comprising receiving, via the vehicle controller from a brake sensor, a sensor signal indicative of a real-time brake torque applied to a road wheel of the motor vehicle, wherein the requested axle torque is modified based on the real-time brake torque.

7. The method of claim 1, wherein calculating the final speed horizon profile as the speed-controlled speed profile is further based on a road grade compensation value.

8. The method of claim 1, further comprising:

predicting a future vehicle speed trajectory profile for the motor vehicle using a dual-track bicycle model of the motor vehicle; and modifying the requested axle torque to minimize a difference, if any, between the future vehicle speed trajectory profile and the final speed horizon profile.

9. The method of claim 1, further comprising calculating a nominal road load vehicle force and an effective road load based on the estimated road grade and the estimated vehicle mass, wherein calculating the final speed horizon profile as the torque-controlled speed profile is further based on the nominal road load vehicle force and the effective road load.

10. The method of claim 1, further comprising:

receiving, via the vehicle controller from a mass estimation module, the estimated vehicle mass of the motor vehicle with a current payload; and receiving, via the vehicle controller from a gradient estimation module, the estimated road grade of the road segment currently being traversed by the motor vehicle.

11. The method of claim 1, wherein the acceleration table includes an acceleration response map file that maps vehicle speed and vehicle acceleration with powertrain torque output, and wherein the transient acceleration table includes a transient acceleration response map file that defines transient regions between adjacent ones of the powertrain torque outputs in the acceleration response map file.

12. The method of claim 1, wherein calculating the final speed horizon profile includes determining a force horizon based on a torque horizon, a brake request horizon, and a nominal road load horizon repeated for a predefined N steps in a predefined horizon.

13. The method of claim 1, wherein the driver input device is an accelerator pedal, wherein the motor vehicle lacks a brake pedal, and wherein the requested axle torque is a part of a braking maneuver in a one-pedal driving (OPD) operation.

14. An electric-drive vehicle comprising:

a vehicle body with multiple road wheels;

a vehicle powertrain with a traction motor mounted on the vehicle body and operable to drive one or more of the road wheels to thereby propel the electric-drive vehicle;

a driver input device operable to receive vehicle control inputs from a driver of the electric-drive vehicle; and a vehicle controller programmed to:

receive, from the driver via the driver input device, an acceleration command for the powertrain of the electric-drive vehicle while traversing a road segment;

determine a torque or acceleration request corresponding to the acceleration command of the driver from an acceleration table;

shape the torque or acceleration request based on a transient acceleration table;

determine compensated and uncompensated accelerations from the shaped torque or acceleration request, wherein the compensated acceleration is based on an estimated road grade of the road segment and an estimated vehicle mass of the motor vehicle, and the uncompensated acceleration is based on a zero road grade and a nominal vehicle mass or the estimated vehicle mass;

calculate a final speed horizon profile as: a speed-controlled speed profile based on the uncompensated acceleration when a vehicle speed of the motor vehicle is at a calibratable or near-zero vehicle speed, a blend-controlled speed profile based on a blend of the compensated and uncompensated accelerations when the vehicle speed is above the near-zero vehicle speed and below a predefined threshold vehicle speed, and a torque-controlled speed profile based on the uncompensated acceleration when the vehicle speed is above the predefined threshold vehicle speed; and transmit a command signal to the powertrain to output a requested axle torque based on the calculated final speed horizon profile.

15. The electric-drive vehicle of claim 14, wherein the driver input device includes a pedal, and wherein the vehicle controller is further programmed to:

receive, from a speed sensor, a sensor signal indicative of a real-time vehicle speed of the electric-drive vehicle; and select a vehicle control mode as a speed control mode or a torque control mode based on the real-time vehicle speed, a pedal position of the pedal, a rate of change of the pedal position, and a measured road grade, wherein the command signal transmitted to the powertrain is further based on the selected vehicle control mode.

16. The electric-drive vehicle of claim 14, wherein the vehicle controller is further programmed to:

receive, from the driver via the driver input device, a deceleration command to reduce the vehicle speed of the electric-drive vehicle; and determine a deceleration or torque request corresponding to the deceleration command of the driver based on the estimated road grade and the estimated vehicle mass, wherein determining the final speed horizon profile as the torque-controlled speed profile is further based on the deceleration or torque request corresponding to the deceleration command of the driver.

17. The electric-drive vehicle of claim 14, wherein the vehicle controller is further programmed to receive, from a brake sensor, a sensor signal indicative of a real-time brake torque applied to one or more of the road wheels of the electric-drive vehicle, wherein the requested axle torque is modified based on the real-time brake torque.

18. The electric-drive vehicle of claim 14, wherein the driver input device is an accelerator pedal, wherein the electric-drive vehicle lacks a brake pedal, and wherein the requested axle torque is a part of a braking maneuver in a one-pedal driving (OPD) operation.

19. The electric-drive vehicle of claim 14, wherein the acceleration table includes an acceleration response map file that maps vehicle speeds and vehicle accelerations with powertrain torque outputs, and wherein transient acceleration table includes a transient acceleration response map file that defines transient regions between adjacent ones of the powertrain torque outputs in the acceleration response map file.

20. The electric-drive vehicle of claim 14, wherein calculating the final speed horizon profile includes determining a force horizon based on a torque horizon, a brake request horizon, and a nominal road load horizon repeated for a predefined N steps in a predefined horizon.

* * * * *